US012691532B2

(12) United States Patent
Browar et al.

(10) Patent No.: US 12,691,532 B2
(45) Date of Patent: Jul. 28, 2026

(54) SYSTEM AND METHOD FOR RADIUS OF CURVATURE MODIFICATION OF OPTICAL PLATES AND LENSES BY IRRADIATION WITH OPTICAL ENERGY

(71) Applicant: Lawrence Livermore National Security, LLC, Livermore, CA (US)

(72) Inventors: Allison Eileen Marie Browar, Livermore, CA (US); Gabriel Mark Guss, Manteca, CA (US); Manyalibo Joseph Matthews, Livermore, CA (US); Nathan James Ray, Tracy, CA (US); Nan Shen, Milpitas, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1158 days.

(21) Appl. No.: 17/112,519

(22) Filed: Dec. 4, 2020

(65) Prior Publication Data

US 2022/0176495 A1     Jun. 9, 2022

(51) Int. Cl.
B23K 26/53 (2014.01)
B23K 26/03 (2006.01)
(Continued)

(52) U.S. Cl.
CPC ............ B23K 26/53 (2015.10); B23K 26/032 (2013.01); B23K 26/0626 (2013.01);
(Continued)

(58) Field of Classification Search
CPC .............................. H01S 3/0071; H01S 3/104
See application file for complete search history.

(56) References Cited

U.S. PATENT DOCUMENTS 6,410,884 B1 *  6/2002  Hackel ................... B21D 11/20
                                         219/121.61
9,038,421 B2 *  5/2015  Berrada Sounni .. C03B 23/0252
                                         65/287
(Continued)

FOREIGN PATENT DOCUMENTS

CN        101257176 A  *  9/2008
CN        101312920 A  *  11/2008    ......... C03B 23/0026
(Continued)

OTHER PUBLICATIONS

CN-101312920-A machine translation (Year: 2006).*
(Continued)

*Primary Examiner* — Jodi C Franklin
(74) *Attorney, Agent, or Firm* — HARNESS, DICKEY & PIERCE P.L.C.

(57) ABSTRACT

The present disclosure relates to an apparatus for modifying a curvature of a thin plate optic using controlled heat and densification of portions of the optic. In one embodiment the system has a support structure for supporting the optic about a perimeter thereof, a laser configured to generate a beam having a predetermined energy, and the beam being directed at one surface of the optic. The beam heats and densifies portions of the optic to create a force on the optic. The force induces a stress produces a controlled deformation of the optic. The controlled deformation at least one of modifies a curvature of, or corrects a defect in, the optic.

12 Claims, 10 Drawing Sheets

(51) Int. Cl.

| | |
|---|---|
| *B23K 26/062* | (2014.01) |
| *B23K 26/082* | (2014.01) |
| *B23K 26/12* | (2014.01) |
| *B23K 26/70* | (2014.01) |
| *G02B 26/08* | (2006.01) |
| *G02F 1/11* | (2006.01) |
| *H01S 3/223* | (2006.01) |

(52) U.S. Cl.
CPC .......... *B23K 26/082* (2015.10); *B23K 26/127* (2013.01); *B23K 26/704* (2015.10); *B23K 26/705* (2015.10); *G02B 26/0816* (2013.01); *G02F 1/11* (2013.01); *H01S 3/2232* (2013.01)

(56) References Cited

U.S. PATENT DOCUMENTS

| | | | | |
|---|---|---|---|---|
| 12,195,388 | B2 * | 1/2025 | Gremmelspacher | .......................... F27D 5/0025 |
| 2004/0037011 | A1 | 2/2004 | Inoue et al. | |
| 2004/0050831 | A1 * | 3/2004 | Tam | ....................... G11B 21/21 |
| 2005/0173389 | A1 | 8/2005 | Tam | |
| 2008/0093349 | A1 | 4/2008 | Bruland et al. | |
| 2008/0105825 | A1 * | 5/2008 | Han | .................. H01L 21/67213 438/479 |
| 2010/0301024 | A1 * | 12/2010 | Unrath | ................... B23K 26/40 219/121.81 |
| 2017/0182590 | A1 | 6/2017 | Goya et al. | |
| 2018/0057390 | A1 * | 3/2018 | Hackert | ................. C03C 3/093 |
| 2018/0318965 | A1 * | 11/2018 | Tateishi | ................. B23K 26/40 |
| 2019/0329350 | A1 | 10/2019 | Unrath et al. | |

FOREIGN PATENT DOCUMENTS

| | | | | | |
|---|---|---|---|---|---|
| CN | 103639590 | A | | 3/2014 | |
| CN | 102645529 | B | * | 10/2014 | ............. G01N 29/36 |
| CN | 106198729 | A | * | 12/2016 | ............. G01H 9/002 |
| CN | 107914084 | A | | 4/2018 | |
| CN | 109521090 | A | * | 3/2019 | ......... G01N 29/4472 |
| CN | 109580586 | A | * | 4/2019 | ........... G01N 21/658 |
| JP | 2002131512 | A | * | 5/2002 | ......... C03B 23/0026 |
| JP | 2013237261 | A | * | 11/2013 | ....... B29D 11/00028 |
| JP | 2018528142 | A | * | 2/2018 | ........... B23K 26/352 |
| KR | 20190115977 | A | | 10/2019 | |
| KR | 20200141532 | A | * | 12/2020 | ............. G02B 27/30 |
| WO | WO-2006005805 | A1 | * | 1/2006 | ......... C03B 23/0258 |
| WO | WO-2017186857 | A1 | * | 11/2017 | ............. B60K 37/06 |
| WO | WO-2018200454 | A1 | * | 11/2018 | ......... B23K 26/0624 |
| WO | WO-2020159666 | A1 | | 8/2020 | |
| WO | WO-2020202976 | A1 | | 10/2020 | |

OTHER PUBLICATIONS

PE2E translation of CN101329204 (Year: 2008).*
Wierzbicki, Tomasz. Massachusetts Institute of Technology, Massachusetts Institute of Technology Course Work, Structural Mechanics, Oct. 1, 2013, pp. 1-19, XP093159201.

Li, Xiao, et al. "Development of an in-situ laser machining system using a three-dimensional galvanometer scanner." Engineering 6.1 (2020): 68-76.
European Patent Office, Extended European Search Report for corresponding European Patent Application No. 21901240.8 mailed May 27, 2024.
P. Temple, W. Lowdermilk, and D. Milam, "Carbon dioxide laser polishing of fused silica surfaces for increased laser-damage resistance at 1064 nm," Appl. Opt., vol. 21, No. 18, pp. 3249-3255, 1982.
H. Murakawa, "Residual stress and distortion in laser welding," Handb. Laser Weld. Technol., pp. 374-398, 2013.
S. Timoshenko and S. Woinowsky-Krieger, Theory of Plates and Shells, Second. McGraw-Hill, 1987.
D. Roylance, "Constitutive Equations," Lecture Notes. Dept of Materials Science and Engineering, Cambridge, MA, 2000.
W. C. Young and R. G. Budynas, Roark's Formulas for Stress and Strain, Seventh. McGraw-Hill, 2002, pp. 120-124.
O. A. Bauchau and J. I. Craig, "Kirchhoff plate theory," pp. 819-914, 2009.
E. Ventsel and T. Krauthammer, *Thin Plates and Shells*. Theory, Analysis, and Applications, 2001.
R. M. Vignes, T. F. Soules, J. S. Stolken, R. R. Settgast, S. Elhadj, and M. J. Matthews, "Thermomechanical modeling of laser-induced structural relaxation and deformation of glass: volume changes in fused silica at high temperatures," J. Am. Ceram. Soc., vol. 96, No. 1, pp. 137-145, 2013.
A. V. Gusarov, M. Pavlov, and I. Smurov, "Residual stresses at laser surface remelting and additive manufacturing," Phys. Procedia, vol. 12, No. Part 1, pp. 248-254, 2011.
J. C. Lambropoulos, S. Xu, T. Fang, and D. Golini, "Twyman effect mechanics in grinding and microgrinding," 1996.
J. C. Lambropoulos, "Twyman effects in thin curved optics," No. Oct. 2017, p. 32, 2017.
E. G. Nikolova, "Review On the Twyman effect and some of its applications," J. Mater. Sci., vol. 20, No. 1, pp. 1-8, 1985.
S. Heidrich et al., "Optics manufacturing by laser radiation," Opt. Lasers Eng., vol. 59, pp. 34-40, 2014.
F. Laguarta, N. B. Lupon, F. Vega, and J. Armengol, "Laser application for optical glass polishing," Proc. SPIE—Int. Soc. Opt. Eng., vol. 2775, pp. 603-610, 1996.
A. Richmann, E. Willenborg, and K. Wissenbach, "Laser Polishing of Fused Silica," Int. Opt. Des. Conf. Opt. Fabr. Test., p. OTuC2, 2010.
J. C. Heap, "Bending of Circular Plates Under a Variable Symmetrical Load," 1964.
John C. Lambropoulous, Tong Fang, Paul D. Funkenbusch, Stephen D. Jacobs, Michael J. Cumbo, and Donald Golin, "Surface microroughness of optical glasses under deterministic microgrinding," Applied Optics, vol. 35, No. 22, Aug. 1, 1996, pp. 4448-4462.
D. Malacara-Hernandez and Z. Malacara-Hernandez, and Z. Malacara. "Handbook of optical design," Third, Taylor and Francis, 2017.
International Search Report and Written Opinion regarding International Patent Application No. PCT/US2021/056849, dated Feb. 11, 2022.

* cited by examiner

| Table 1: Typical manufacturing tolerances for lenses [3] | | | |
|---|---|---|---|
| Parameter | Commercial | Precision | High Precision |
| Wavefront deformation | 0.25 wave rms | 0.1 wave rms | 0.05 wave rms |
| Radius of curvature | 1.0% | 0.1% | 0.1% |
| Thickness | ± 0.2 mm | ± 0.2 mm | ± 0.2 mm |
| Decentration | 0.1 mm | 0.1 mm | 0.001 mm |
| Tilt | 1 arcmin | 10 arcsec | 1 arcsec |

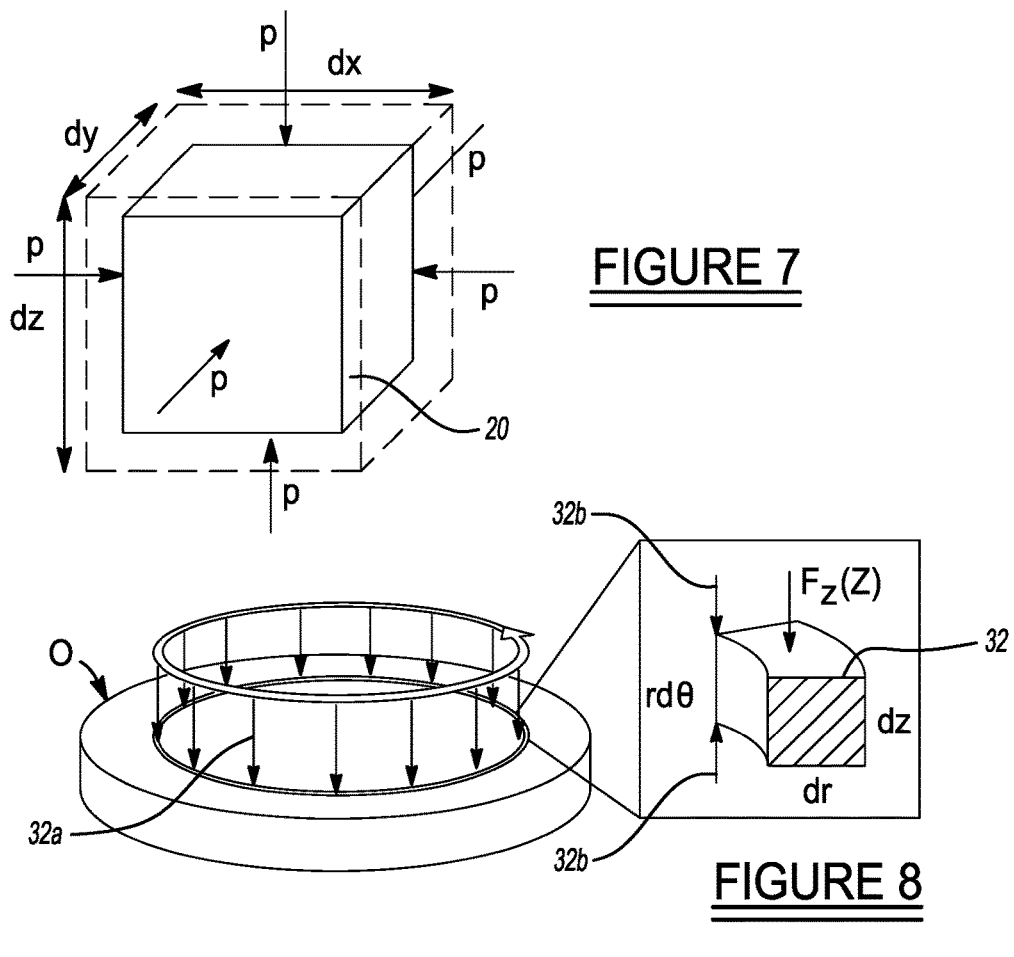
FIGURE 7
FIGURE 8
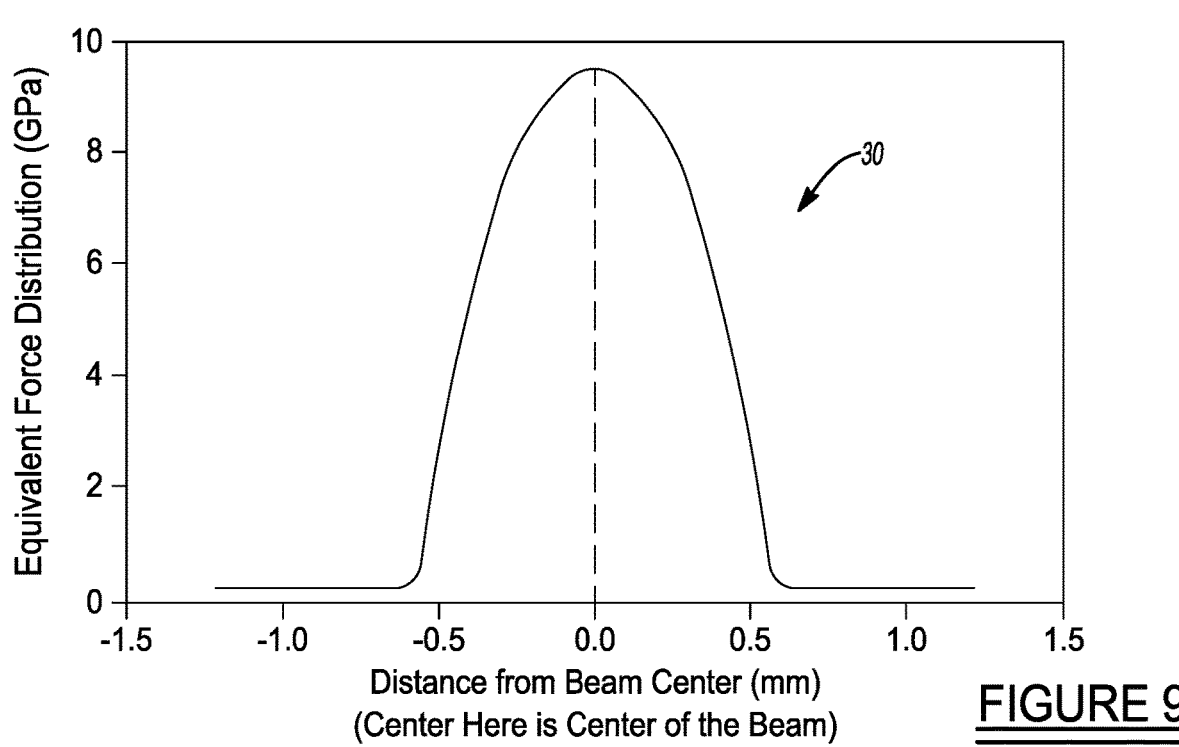
FIGURE 9

| Property | Symbol | Value | Units |
|----------|--------|-------|-------|
| Plate Thickness | $h$ | 3.04 | mm |
| Poisson Ratio | $v$ | 0.16 | |
| Elastic Modulus | $E$ | 73 | GPa |
| Shear Modulus | $G$ | 31 | GPa |
| Bulk Modulus | $K$ | 35.9 | GPa |
| Annular Radius | $ro$ | 10 | mm |
| Plate Radius | $a$ | 12.7 | mm |

1

SYSTEM AND METHOD FOR RADIUS OF CURVATURE MODIFICATION OF OPTICAL PLATES AND LENSES BY IRRADIATION WITH OPTICAL ENERGY

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to modifying a curvature of thin plates, and more particularly thin plate optical elements such as thin plate optical lenses, mirrors and other like components, and more particularly modifying a curvature of such elements and components using optical energy, to induce stress in the element which acts to modify a curvature of the element.

BACKGROUND

The statements in this section merely provide background information related to the present disclosure and may not constitute prior art.

Optical components with multiple lens elements are ubiquitous in optical assemblies including cameras, eye loupes, microscopes, etc. These types of lenses have a designated thickness, centering, and curvature which all work together to create a designed optical image/focal plane. Slight variations in these manufactured lenses can alter the focal plane image. To overcome this, higher tolerances are set for lens manufacturing. Unfortunately, this leaves a lower yield for production and higher cost. Another disadvantage is that process for polishing and form correcting such lenses currently requires material removal.

FIG. 1 is an illustration of a typical lens assembly commonly used by lens designers called a "triplet." This assembly example consists of three lenses divided by spacers and placed into a tube. The lens material, spacing, and focal lengths work in harmony to form an image. Aberrations are created from both idealistic lens design restrictions and manufacturing errors. Some examples of manufacturing errors are wavefront deformation, radius of curvature, center thickness, decenter, and tilt. These errors are quantified in FIG. 2 (Table 1) delineating commercial, precision, and high precision tolerances. Higher precision requirements can increase the price of each optic significantly, and in some cases exponentially.

Wavefront deformation is a sub aperture specification designated by the waviness and roughness of the optic. It is quantified in terms of waves of the designed wavelength to be used. For reference, visible wavelengths are between 400 nm-700 nm. In this context, an optic designed for 400 nm would be commercially made within a 100 nm root mean squared ("rms") roughness and 20 nm rms for high precision tolerances. The roughness is proportional to the abrasive size used when polishing. Additionally, the time required to achieve the roughness is exponential with decreased abrasive size. Once the desired roughness is achieved, the optical contour cannot be changed without major correction and repeating the polishing process.

Thickness variations are overcome by adding in air gaps using shims. However, refractive index in air and in the glass are different which cause problematic aberrations compounded through the system. Centering is accomplished by creating the optic with the correct curvature and then cutting around the sides of the optic with the curvature center at the center of the cut optic. Curvature is accomplished by using grinding and polishing with abrasives, which removes material at spatial locations. The process is repeated until the lens curvature is within tolerance. Because this process requires material removal, the thickness of the optic is affected during any correction.

In view of the foregoing, there remains a significant need for systems and methods that can more easily and economically adjust for, or correct for, the above-discussed types of manufacturing errors when making optical elements.

SUMMARY

This section provides a general summary of the disclosure, and is not a comprehensive disclosure of its full scope or all of its features.

In one aspect the present disclosure relates to an apparatus for modifying a curvature of thin plate. The apparatus may comprising a support structure for supporting the thin plate about a perimeter thereof, and a laser. The laser may be configured to generate a beam having a predetermined energy (or fluence), with the beam being directed at one surface of the thin plate. The beam operates to heat and densify portions of the thin plate to create a force on the thin plate. The force causes a stress which induces a controlled deformation of the thin plate to at least one of modify a curvature of the thin plate or to correct a defect in the thin plate.

In another aspect the present disclosure relates to an apparatus for modifying a curvature of a thin plate optic. The apparatus may comprise an electronic controller, a support structure for supporting the thin plate optic about a perimeter thereof, a laser, an acousto-optic modulator, and a beam steering system. The laser may be configured to generate a beam having a predetermined energy, the beam being directed at one surface of the thin plate optic. The acousto-optic modulator is configured to assist in controlling a power of the beam received from the laser which is applied to the thin plate optic. The beam steering system is responsive to the electronic controller and configured to steer the beam in a circular path over at least one of an upper surface or a lower surface of the thin plate optic, to thus trace at least one substantially continuous line segment on at least one of the upper surface or the lower surface of the thin plate optic. The at least one substantially continuous line segment heats and densifies portions of the thin plate optic to create a line force on the thin plate optic. The line force induces a stress which produces a controlled deformation of the thin plate optic, to at least one of modify a curvature of the thin plate optic or to correct a defect in the thin plate optic.

In still another aspect the present disclosure relates to a method for modifying a curvature of a thin plate optic. The method may comprise supporting the thin plate optic about a perimeter thereof, and directing a laser beam having a predetermined energy at one of an upper surface or a lower surface of the thin plate optic. The method may further include using the predetermined energy of the laser beam to heat the thin plate optic to create a controlled force acting on the thin plate optic. The controlled force induces a deformation of the thin plate optic which causes a controlled deflection of a central portion or a portion of the thin plate optic. The controlled deflection acts to at least one of modify a curvature of the thin plate optic or to correct a defect in the thin plate optic.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 7 is a high level perspective drawing showing pressure exerted on a unit volume from hydrostatic stress due to densification;

FIG. 8 is a perspective diagram Illustration of a uniformly distributed annular line load on an optic; from the line load, a force on a volume element in cylindrical coordinates is drawn;

4

Figures 10, 11:
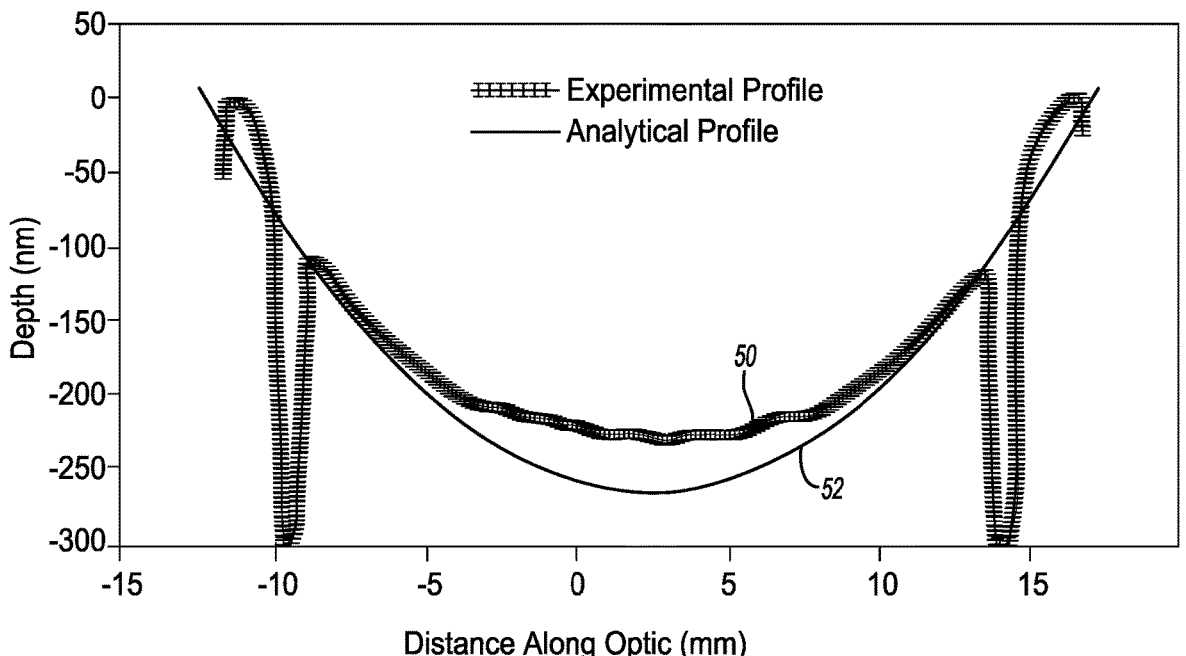
Figure 12A:
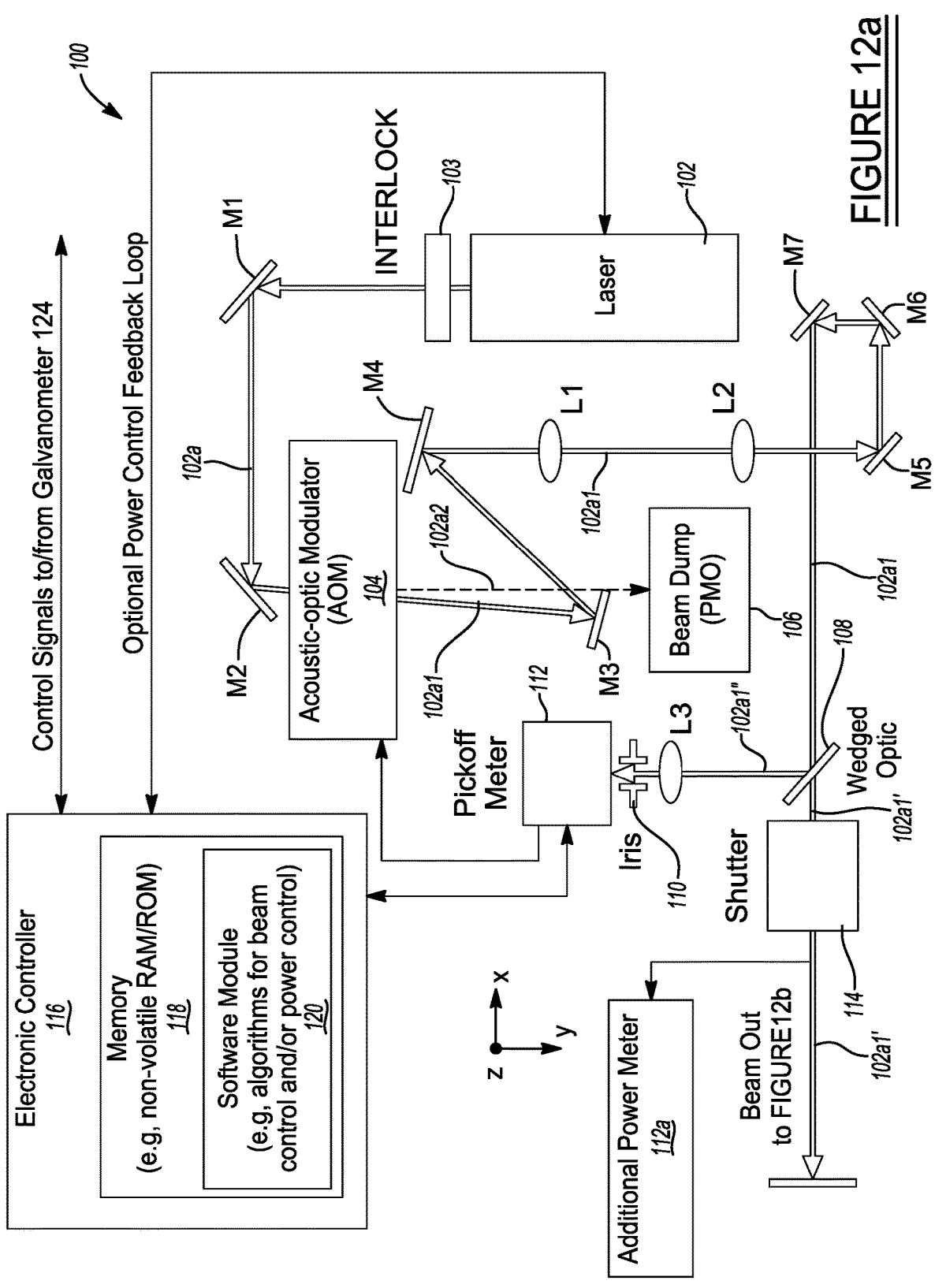
Figures 12B, 12C:
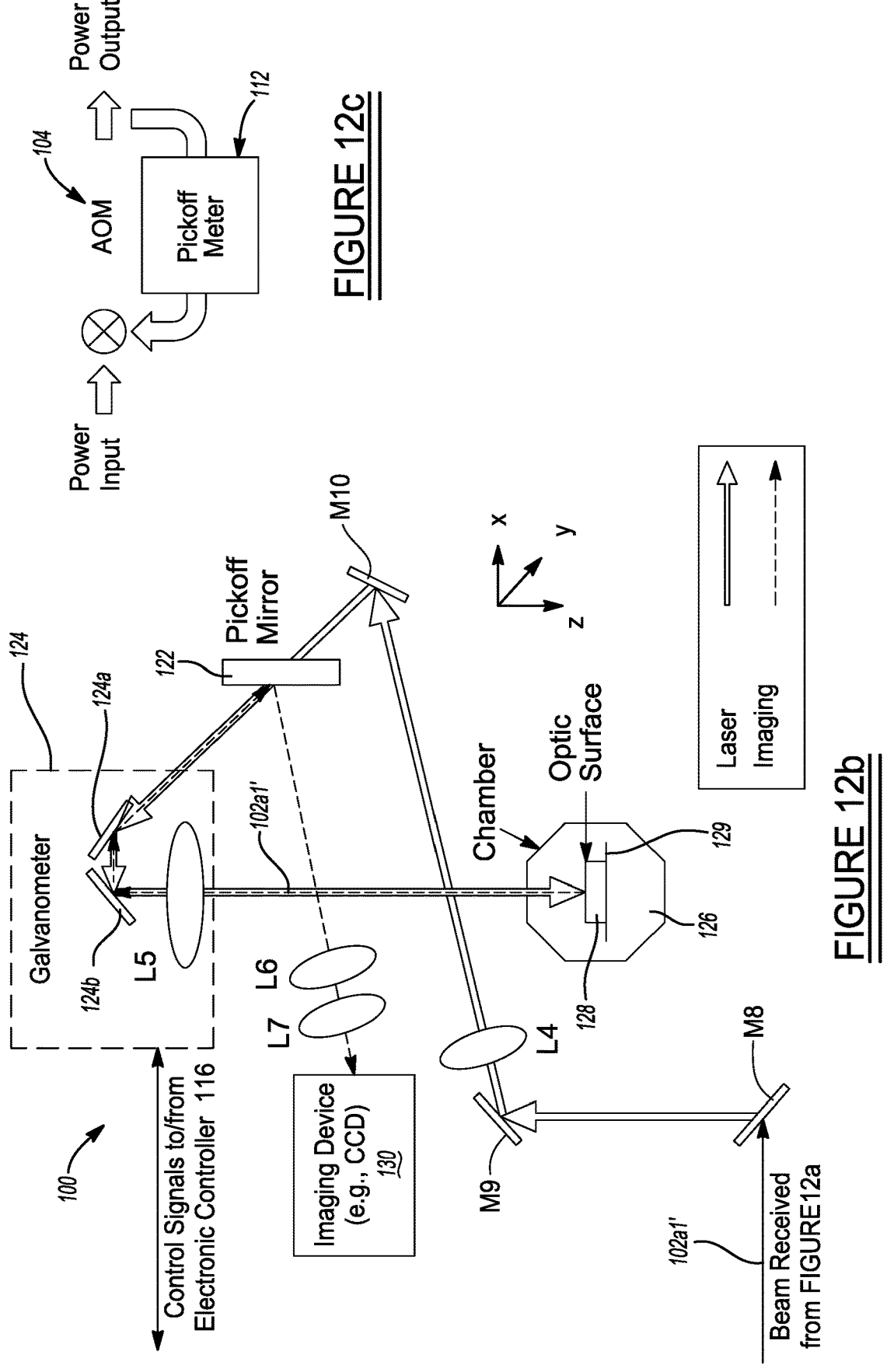
Figure 13:
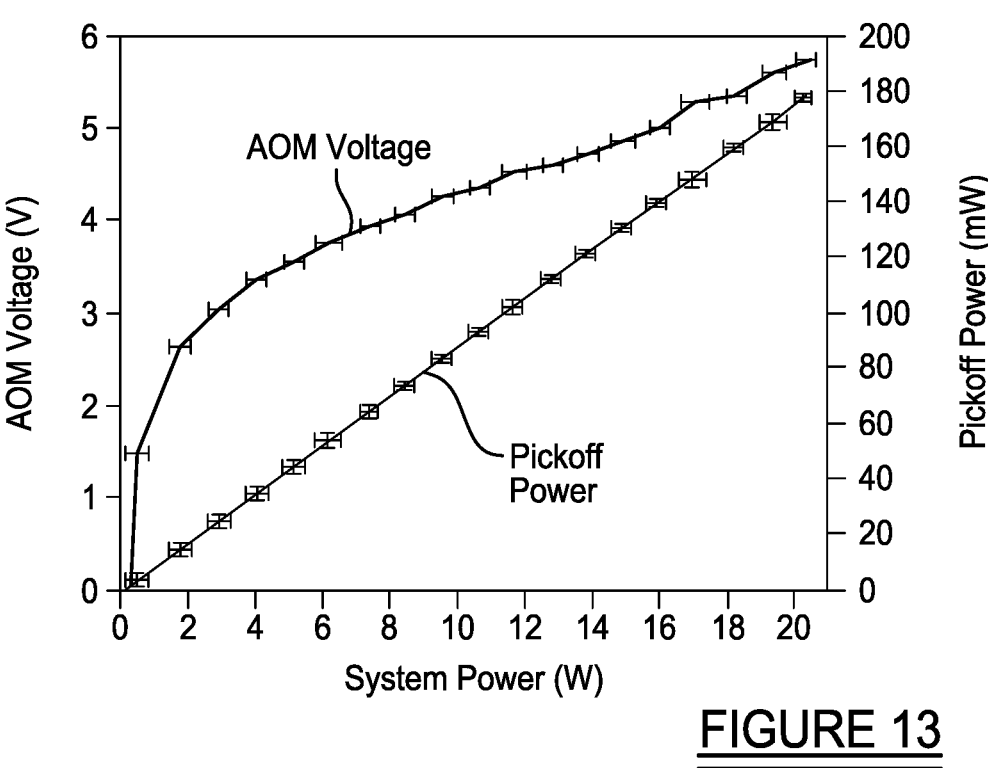
Figure 14:
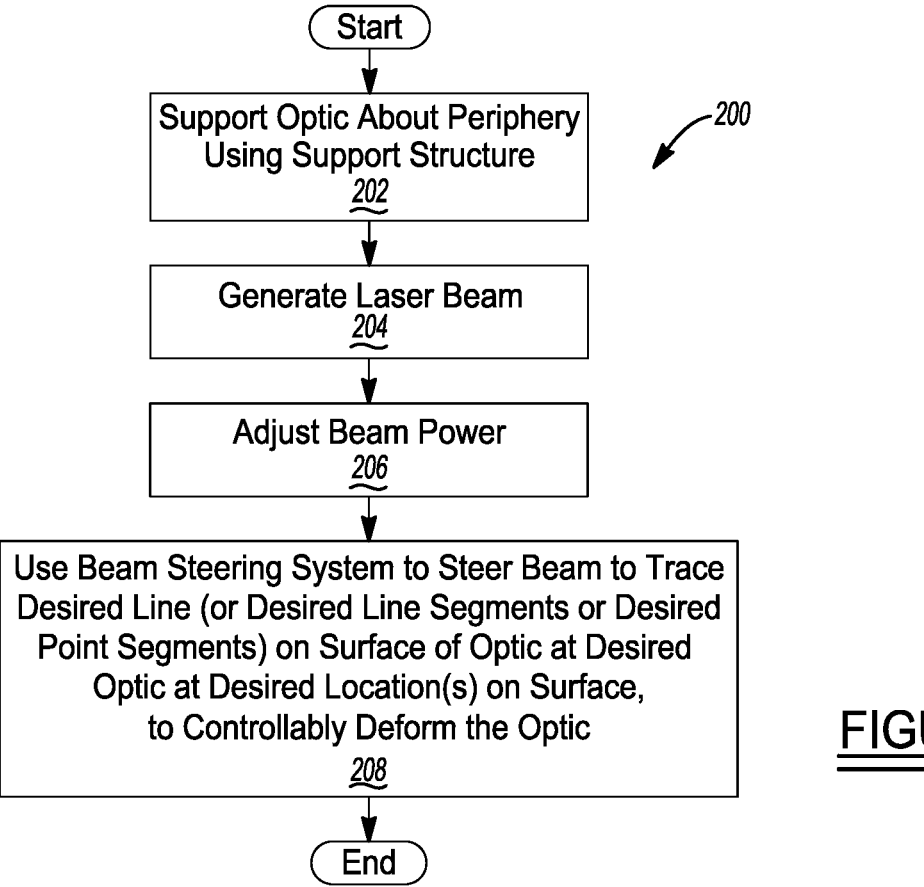

FIG. 9 is a force distribution graph across the beam path for a 12 W laser moving 1 mm/s with 0.75 mm beam radius; the x-axis in this graph is centered around the beam position, $r_0$;

FIG. 10 a table showing material and experimental properties used in full aperture plate bending, and where the material properties were found are for Corning 7980 fused silica; and FIG. 11 is a graph showing a comparison of the depth profile along the center of the optic experimentally measured and analytically calculated;

FIGS. 12a and 12b show one embodiment of a system in accordance with the present disclosure for implementing the full aperture bending on a thin plate;

FIG. 12c is a high level diagram illustrating the closed loop power control scheme implemented by the system of FIGS. 12a and 12b;

FIG. 13 is a graph showing the results of calibration data for closed loop power control of the system of FIGS. 12a and 12b; and FIG. 14 shows a high level flowchart 200 illustrating operations that may be performed using the system 100 of FIGS. 12a and 12b. At operation 202 the optic 128 may be supported about its periphery, for example by the support structure 129. At operation 204 a laser beam may be generated using the laser 102. At operation 206 the beam power of the laser beam may be adjusted, for example using the acousto-optic modulator 104. At operation 208, the beam may be steered as needed to trace a line on the optic 128 (or a plurality of line segments, or any other desired line or point segment(s)) to controllably deform the optic 128.

DETAILED DESCRIPTION

Example embodiments will now be described more fully with reference to the accompanying drawings.

The present disclosure makes use of well known "plate theory" to describe the deformation of a plate when it is subjected to lateral stress. The plate is described by two sides much larger than the third side. Its thickness is measured from the center of the shortest side. The assumptions for plate theory are that the deflections are small and they are only in the direction normal to the surface. For a plate initially flat with center plane on the x-y axis, the deformation is described by the point $w_d(x,y)$, which is the deviation from the x-y plane as shown in FIG. 3.

Figures 1, 2:
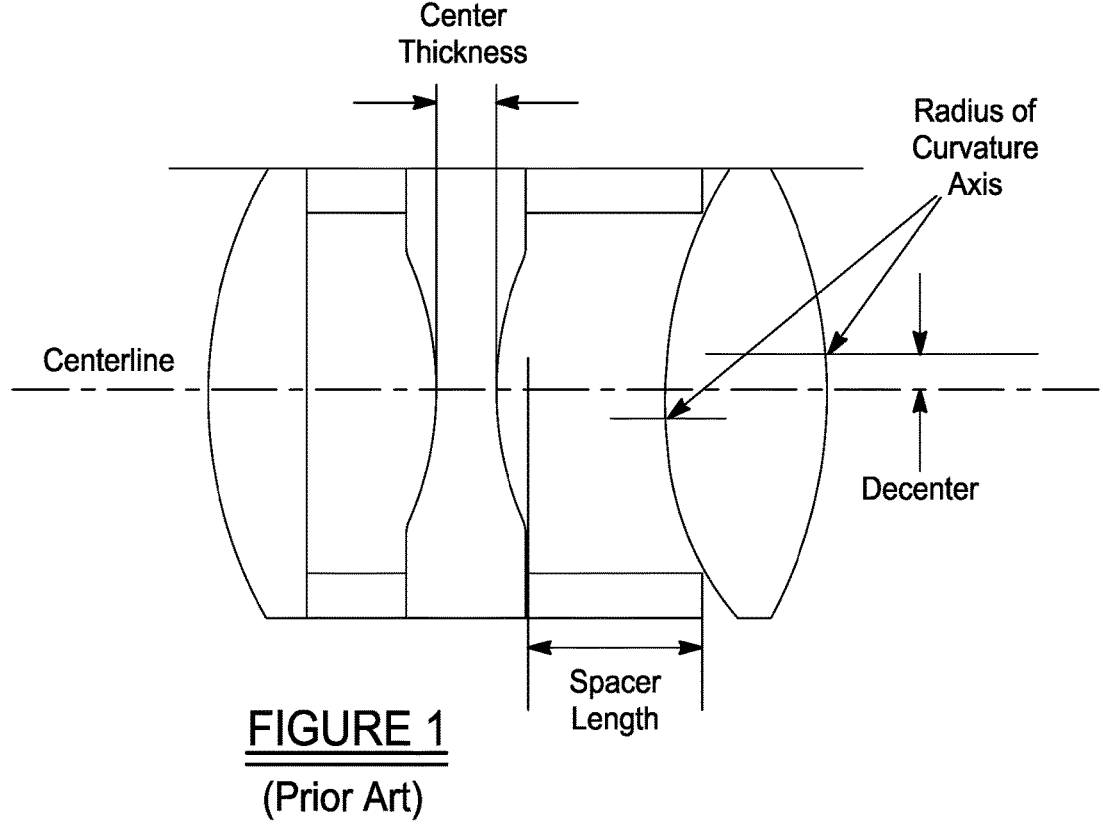
FIG. 1 is a high level side view of a typical, prior art lens assembly indicating various manufacturing errors that affect imaging results, including a decenter error, center thickness, and further illustrating how the thickness of the outer edge of the optic affects spacer length required for assembly.
FIG. 2 is a table which quantifies commercial, precision and high precision tolerances for aberrations created during manufacturing of a typical prior art lens assembly including wavefront deformation, radius of curvature, center thickness, decenter and tilt.
Figures 3, 4A, 4B:
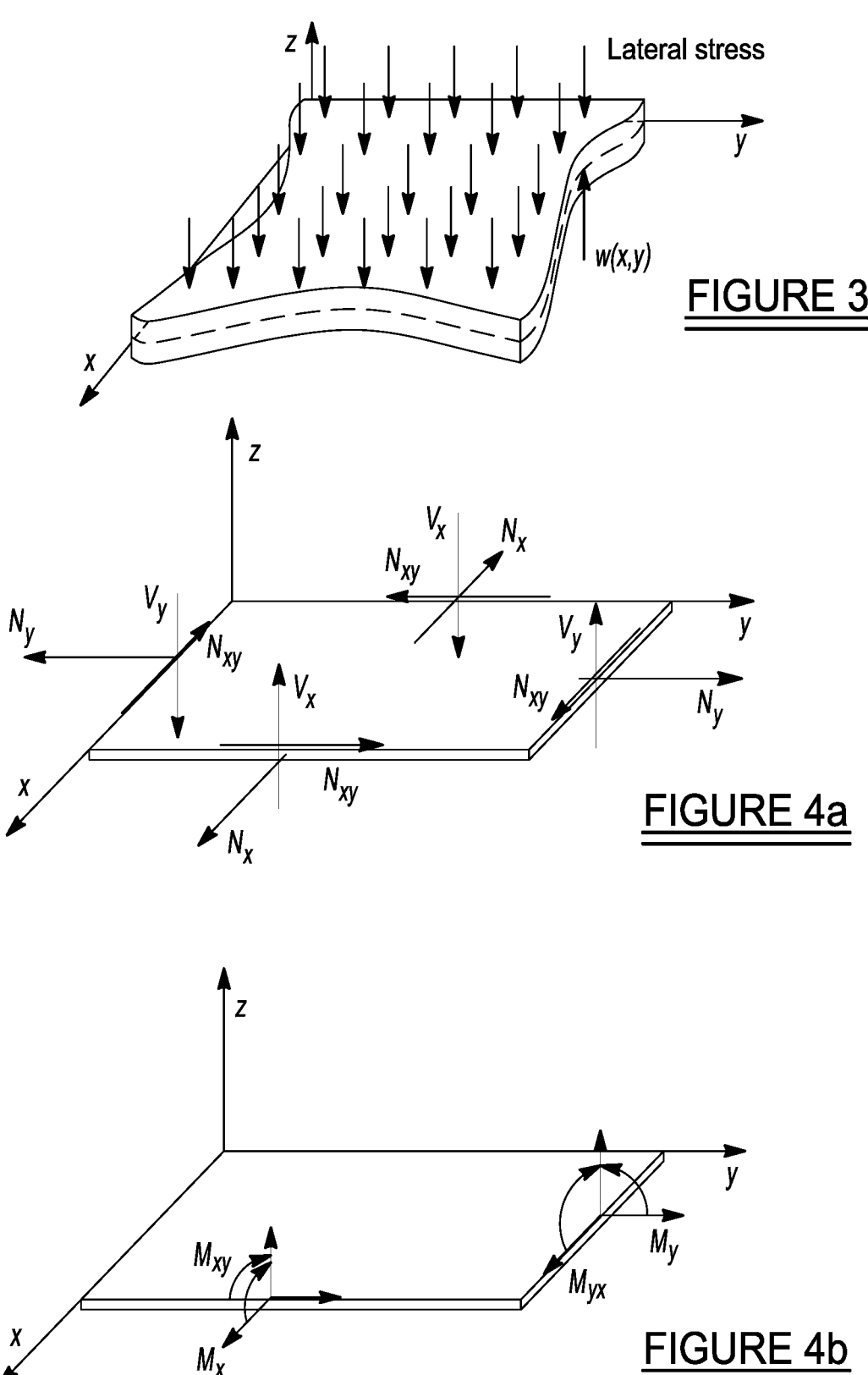
FIG. 3 is a high level diagram of a plate showing the center plane of the plate originally on the x-y plane is deformed, wherein the deformation described by a surface $w_d(x,y)$.
FIG. 4a illustrates resultant forces per unit length integrated through the thickness of a plate, where the Normal forces, $N_x$ and $N_y$ result from in plane stress; shearing force $N_{xy}$ is from in-plane shearing force and $V_x$ and $V_y$ are from out-of-plane shearing forces.
FIG. 4b shows how the plate of FIG. 4a is affected by bending moments, $M_x$ and $M_y$, and twisting moments, $M_{xy}$ and $M_{yx}$, per unit length, which also result from uneven stress through the thickness of the plate shown in the positive direction.

In a plate with sufficiently small thickness, equivalent forces acting on the volume can be calculated by integrating through the thickness as shown in FIG. 4a. For the present disclosure, the terminology "thin plate" can be understood to mean a plate with a length dimension (e.g., diameter) which is at least 8 times a thickness of the plate. The following discussion will make reference to a circular plate, but it will be appreciated that the present disclosure is not limited to only circular plates, but may be used to controllably change the shape of plates of virtually any shape (e.g., square, oval, etc.), provided the ratio of dimension to plate thickness is at least about 8:1 or greater.

For the following discussion, consider a force acting on a volume, the in-plane normal forces are shown to be:

$$N_x = \int_{-d/2}^{d/2} \sigma_{xx} dz$$

-continued $$N_y = \int\limits_{-d/2}^{d/2} \sigma_{yy} dz$$

where $N_x$ and $N_y$ are the normal forces per length acting along the plane. The force acting on the volume can vary through thickness creating moments. In-plane bending moments per length are described by an integral of the stress times the distance from the mid plane or:

$$M_x = - \int\limits_{-d/2}^{d/2} z\sigma_{xx} dz \qquad \text{(Eq. 10)}$$

$$M_y = - \int\limits_{-d/2}^{d/2} z\sigma_{yy} dz$$

In-plane shear force and twisting moment can be written as:

$$N_{xy} = \int\limits_{-d/2}^{d/2} \tau_{xy} dz \qquad \text{(Eq. 11)}$$

$$M_{xy} = \int\limits_{-d/2}^{d/2} z\tau_{xy} dz$$

respectively. An out-of-plane shear stress may also act on the volume and is written as:

$$V_x = - \int\limits_{-d/2}^{d/2} \tau_{zx} dz \qquad \text{(Eq. 12)}$$

$$V_y = - \int\limits_{-d/2}^{d/2} \tau_{yz} dz$$

Using the definitions of the stress acting on a volume described above, the full aperture plate deflection can be calculated from sub-aperture stress concentration. The in-plane stresses acting on the plate are membrane forces that are applied if the volume is constricted in the x and y directions. Because the optic in this case is not being restricted, the membrane stress is considered negligible. The problem then can be reduced so there are only lateral forces acting on the surface of the optic, as shown in FIG. 3, and the deformation of the originally flat plate is then $w_d(x,y)$. For this case where the force, $F_{zz}$, is acting in the $-z$ direction, the governing equation can be written as the equation of Sophie Germain:

$$\nabla^4 w_d = \frac{-F_{zz}}{D} \qquad \text{(Eq. 13)}$$

where $w_d$ is the deformation of the plate and $$D = \frac{Ed^3}{12(1-v)} \qquad \text{(Eq. 14)}$$

is the bending stiffness. In Equation (14), E and v are the elastic modulus and Poisson's ratio of the material, respectively, and dis the thickness of the plate.

Full Aperture Bending

Figure 5A:
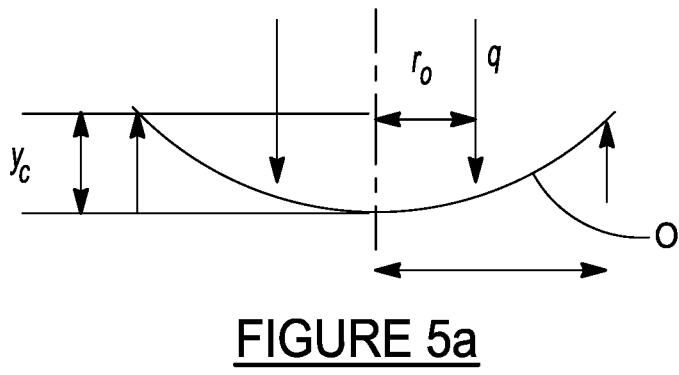
FIG. 5a is a simplified side diagram of an optical element forming a circular thin plate, showing an annular line load, q, with radius $r_0$ on the circular plate, where the circular plate has a radius "a"
Figure 5B:
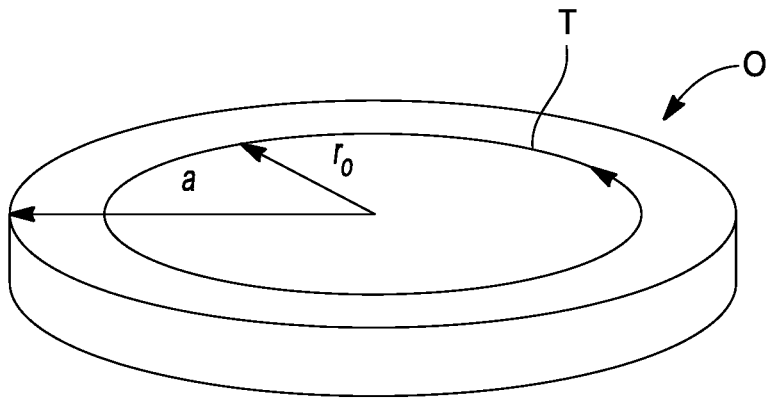
FIG. 5b shows a perspective diagram of a test plan for a singular annular track with radius $r_0$ on the optic to study full aperture bending radius.
Figure 6A:
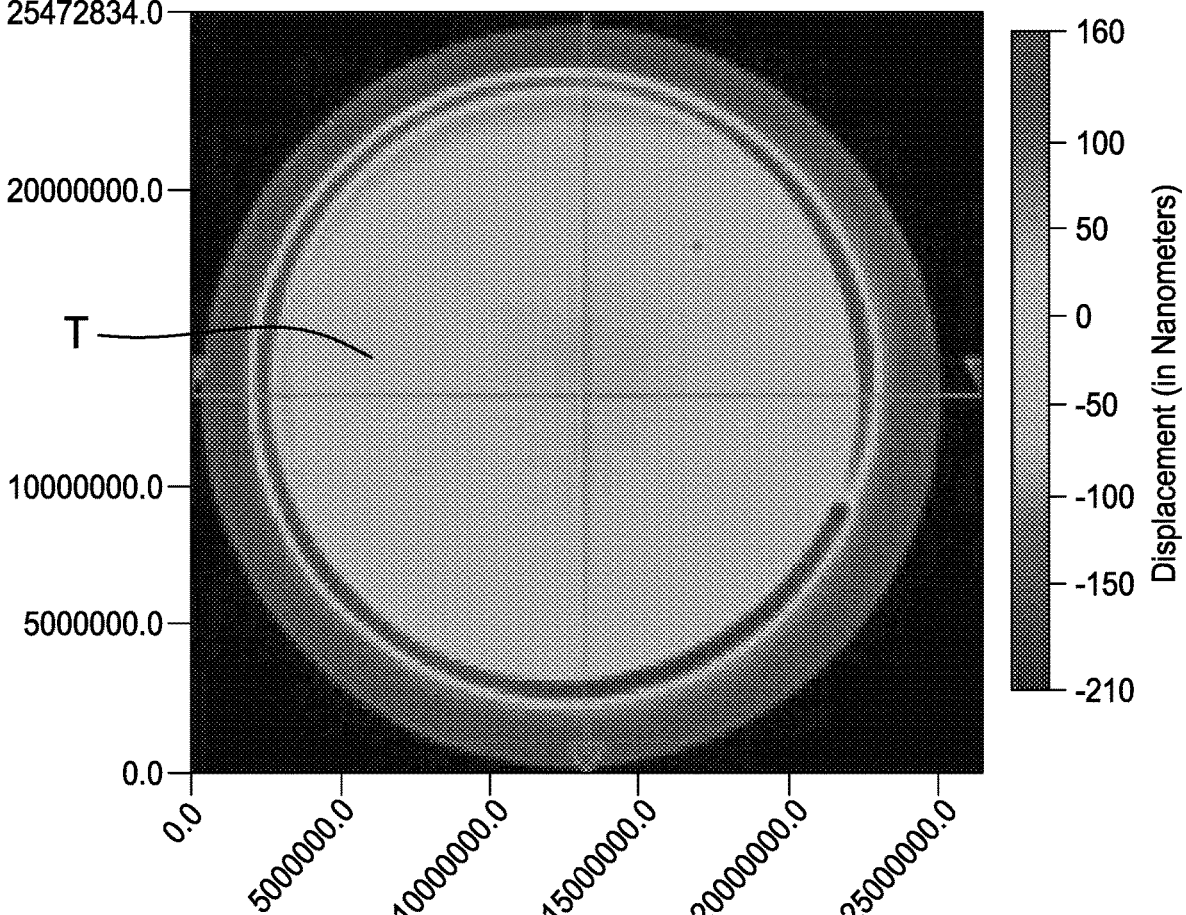
FIG. 6a is a full aperture profile of a 25.4 mm diameter optic with a 10 mm radius annular track; the units for the axes and the corresponding color bar is nanometers.
Figure 6B:
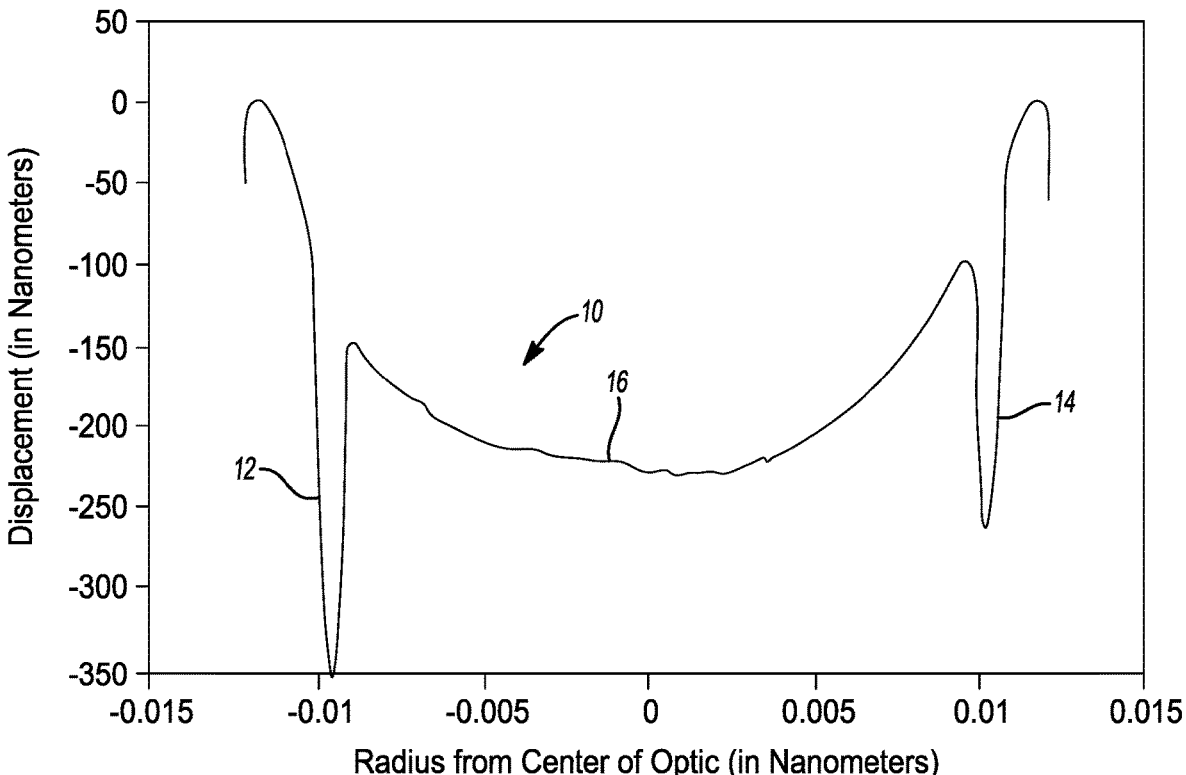
FIG. 6b is a graph showing a depth profile across the diameter of the optic after being corrected for tilt and piston.

Plate theory as described above can be used to study the effect of stress on the full aperture optic. As an extension to the sub-aperture volumetric change, a known scenario with a solution in plate theory was tested by the co-inventors to observe and describe full aperture bending that occurs from laser polishing. The scenario with an already derived solution to plate theory is drawn in FIG. 5a. FIG. 5a shows a circular optic "O" (forming a thin plate) with radius a, with simply supported edges, is experiencing an axisymmetric line load, q, with radius r0. As a result, the center of the optic O is deflected by a distance yc. To test this scenario, a single circular track "T", as shown in FIG. 5b, was melted on the surface of the optic O to induce full aperture bending. Measurements on the surface of the optic were taken using interferometry. The profile of the 25.4 mm diameter optic is shown in FIG. 6a with an annular track "T" of a 12 W beam moving 1 mm/s and having 1.5 mm e-2 diameter. The track T has a 10 mm radius. FIG. 6b shows a line profile 10 across the center of the optic O. The track T has densified on either side of the optic, indicated by portions 12 and 14 of the curve, and created a full aperture bend along a central area 16 of the optic O with central displacement of 225 nm.

Figure 5C:
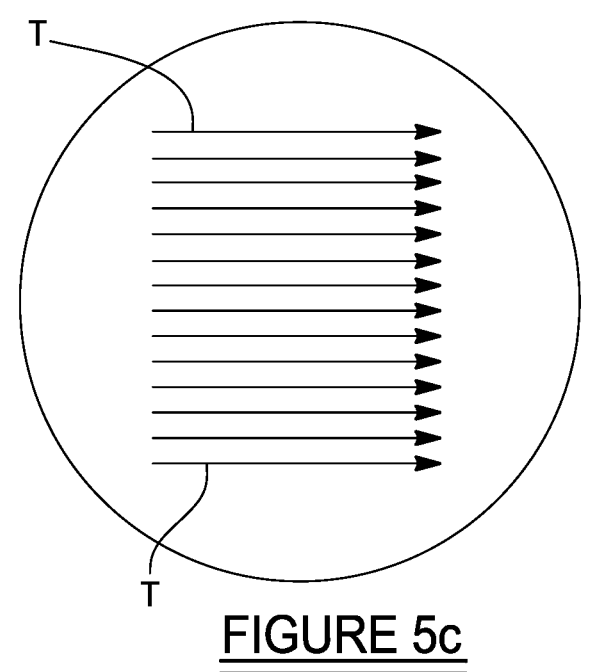
FIG. 5c shows another example of a pattern or adjacent line segments that may be traced by a laser and used to accomplish full aperture bending of the optic, along with a depth of line pattern.

While the full circular track shown in FIG. 5b may be preferred in many implementations, it will be appreciated that other types of track segments may be used. For example, FIG. 5c shows multiple line segments. Other arrangements and/or shapes of line segments (continuous or discontinuous) are possible as well. As such, the present disclosure is not limited to use with only a continuous circular track T.

To describe the full aperture bending effect, an equivalent line force acting on the optic was derived using the bulk modulus. The volumetric change can be used in the bulk modulus equation, and when rearranged, becomes, $$p = \frac{-K\Delta V}{V_i} \qquad \text{(Eq. 93)}$$

where, again, p is the hydrostatic pressure, K is the material bulk modulus, $\Delta V$ is the change in volume, and $V_i$ is the original volume. Assuming that no mass is lost through the process, the volume change, $\Delta V$, can be written as:

$$\Delta V = V_f - V_i = \frac{m}{\rho_0 + (Tf_\infty - Tf_i)\Delta\rho} - \frac{m}{\rho_0} \qquad \text{(84)}$$

where $V_f$ and $V_i$ are the final and initial volume, respectively, of a volume element, m is the mass of the volume element, $\rho_0$ is the initial density of the material, $Tf_i$ is the initial fictive temperature and $Tf_\infty$ is the final fictive temperature after the material has cooled. $\Delta\rho$ is the linear change in density with change in fictive temperature. For fused silica $\Delta\rho=9.33\pm0.2$ $g\cdot m^{-3}\cdot K^{-1}$, and is constant with change in fictive temperature.

In Euclidean space, dividing by the initial volume, factoring out the mass and original density, and integrating over the initial volume element, Equation (84) can be rearranged to give:

$$\int_{V_i} \frac{\Delta V}{V_i} dxdydz = \int_{V_i}\left(\frac{1}{1+(Tf_\infty - Tf_i)\Delta\rho/\rho_0} - 1\right)dxdydz. \tag{85}$$

The expression $\Delta V/V_i$ is simply the integrand of Equation (85):

$$\frac{\Delta V}{V_i} = \frac{1}{1+(Tf_\infty - Tf_i)\Delta\rho/\rho_0} - 1 \tag{86}$$

From this, Equation (93) becomes:

$$p = K\left(\frac{1}{1+(Tf_\infty - Tf_i)\Delta\rho/\rho_0} - 1\right). \tag{Eq. 94}$$

The bulk modulus for Corning 7980 is 35.9 GPa.

The hydrostatic pressure, when applied to the surface area of a volumetric unit 20, is shown in FIG. 7. The pressure, p, is applied to each surface equally. The stress in the z direction can be calculated as:

$$\sigma_{zz} = \frac{1}{3}p. \tag{Eq. 95}$$

In the elemental unit 20 volume of FIG. 7, the pressure is acting on the top and the bottom surfaces equally. The equivalent force in the z direction for the volume under hydrostatic pressure is then:

$$F_z(z) = \frac{p(z)}{6}dxdy. \tag{Eq. 96}$$

The force described in Equation (96) is illustrated as acting on a volume fraction in FIG. 8 with equivalent cylindrical coordinates using the variable transformations $$r = \sqrt{x^2 + y^2}$$

and $\tan(\theta)=y/x$. The volume fraction is in cylindrical coordinates and will be used to derive the equivalent line load acting on the surface of the optic O. The line load is depicted by arrows 32a in FIG. 8.

The equivalent force distribution along the cross section of the beam 32 (from FIG. 8) is shown in the graph 30 of FIG. 9. This force was calculated by applying the volumetric change and bulk modulus described in Equation (94) to the force in Equation (96) and summing the force through the material thickness of the optic O. The force distribution in FIG. 9 is centered around the beam 32 annular radius, $r_0$, in FIG. 8 (where $r_0$, is depicted in FIG. 5b) along the beam cross section, as indicated by arrows 32a in FIG. 8. The force distribution, $F_z(r,\theta)$, can be used to derive the line load, q, using cylindrical coordinates, $$q = \frac{1}{2\pi r_0}\int_{r_0-y/2}^{r_0+y/2} F_z(r,\theta)rdrd\theta, \tag{Eq. 97}$$

where y is the width of the force distribution.

The line load calculated in (97) can be used to calculate the center deflection, $y_c$, using the solution, $$y_c = \frac{-qa^3}{2D}\left(\frac{L_9}{1+v} - 2L_3\right), \tag{Eq. 98}$$

where, $$L_9 = \frac{r_0}{a}\left\{\frac{1+v}{2}\ln\frac{a}{r_0} + \frac{1-v}{4}\left[1-\left(\frac{r_0}{a}\right)^2\right]\right\}, \tag{Eq. 99}$$

and, $$L_3 = \frac{r_0}{4a}\left\{\left[\left(\frac{r_0}{a}\right)^2 + 1\right]\ln\frac{a}{r_0} + \left(\frac{r_0}{a}\right)^2 - 1\right\}. \tag{Eq. 100}$$

Equations (98)-(100) are solutions to the plate theory scenario described above. In these equations, v is poisson's ratio of the material and $$D = \frac{Eh^3}{12(1-v^2)} \tag{Eq. 101}$$

is the material stiffness function with h being the plate thickness. FIG. 10 (Table 3) shows material and experimental properties used to calculate the center deflection of the annular load created using a 12 W beam moving 1 mm/s. The calculated deflection is 261 nm.

FIG. 11 shows an average depth profile measured from the optic plotted, represented by curve 50, along with the calculated depth profile from plate theory, represented by curve 52. Discrepancies of the analytical solution and experimental measurement can be attributed to the decentering of the annular load as observed in FIG. 6a and that the track T was not uniform around the optic. This analysis also neglects any shear stress that may affect the moment sum acting on the plate. Further studies into full aperture bending may need to be done for even greater control of the optic shape using laser polishing.

Referring to FIGS. 12a and 12b, one embodiment of a system 100 that may be used to carry out the controlled full aperture plate bending is shown in accordance with the present disclosure. In this example the system 100 implements a closed-loop power control configuration, although an open loop power control scheme could just as readily be used. The system 100 may include, as shown in FIG. 12a, a laser 102, an interlock 103, an acousto-optic modulator 104, an initial power meter 106, a plurality of lenses L1-L3, mirrors M1-M7, a wedged optic 108, an iris 110 and a pickoff power meter 112 and a shutter aperture 114. An electronic controller 116 having a memory 118 (e.g., non-volatile RAM/ROM, etc.) may be included for controlling one or more components of the system 100. The memory 118 may be used to store a software module 120 which contains algorithms for beam control and/or power control. An optional power control feedback line 116 to the laser 102 is also shown, allowing a degree over the output power generated by the laser 102, although with the laser operating at full output, this is not needed.

FIG. 12b shows additional components of the system 100 which may include a plurality of additional lenses L4-L5, an additional plurality of mirrors M8-M10, and a beam steering subsystem 124, which in this example is a galvanometer. The system 100 may also include a chamber 126 for holding a thin plate optic 128. A beam output from the components shown in FIG. 12a is indicated by 102a1' in FIG. 12a, and shown indicated by the same reference number in FIG. 12b being received for application to the optic 128.

Beam Conditioning, Power Control and Gate Control

The laser 102 used in this embodiment of the system 100 is a $CO_2$, continuous wave (CW) laser with a beam having 10.6 μm wavelength, and with the beam capable of a 30 W output (e.g., GEM series laser available from Coherent Inc., of Palo Alto, CA). The optical path for beam conditioning, power, and gate control is shown in FIG. 12a. In FIG. 12a the laser 102 generates a beam 102a which has the full power output from the laser. The beam 102a may be sent through the interlock 103, which is used for a laser safety shut off. The beam 102a is then steered to the acousto-optic modulator (hereinafter "AOM", e.g., available from ISOMET Corp. of Springfield, VA) 104 which deflects the beam 102a into two beam paths, indicated by beam portions 102a1 and 102a2.

The amount of beam diffraction introduced by the AOM 104 depends on a magnitude of a drive signal (e.g., voltage signal) sent to a driver within the AOM 104. The beam portion 102a2 that is not diverted is sent to the initial power meter 106 which acts as a beam dump, removing the excess power from the system 100.

The beam 102a1 that is deflected by the AOM 104 is sent through two lenses, L1 and L2, with focal lengths in this example of 101.6 mm and 50.8 mm, respectively. These lenses L1 and L2 are used to reduce and collimate the beam 102a1 so that it is small enough to pass through the shutter aperture 114. The initial spot size of the beam 102a1 has a 10 mm diameter, and the resulting collimated beam 102a1 has a 5 mm diameter in this example.

The beam 102a1 is then separated to regulate the power using a closed loop control. The collimated beam 102a1 is sent to the wedged optic 108 with one side having an antireflective coating and the other side uncoated. The wedged optic 108 in this example diverts about 10% of the power (represented by beam portion 102a1" toward the pickoff power meter 112. Although there is an antireflective coating on the back side of the wedged optic 108, the beam still reflects some of the power on that surface, as a ghost image. Because the optic 108 is wedged, the beams from each surface diverge at an angle to each other. It was found that the wedged optic 108 is highly advantageous in preventing interferometric effects on the pickoff power meter 112, which can change with the inevitable heating of the optic 108.

The pickoff beam 102a1" is then sent through the focusing lens L3 to sufficiently reduce the size of the beam 112a1" on the pickoff power meter 112 so that the full beam is on the sensor within the pickoff power meter. The ghost image is removed using the iris 110 to pass the pickoff beam 112a1" and block the ghost image. The pickoff power meter 112 is preferably also not at the focus of the focusing lens L3 to prevent heating effects and damage from the focused beam 112a1".

Power Calibration

The pickoff power meter 112 is used to monitor the power going into the system 100 and to adjust the voltage going to the AOM 104 for any fluctuations. The power going to the fused silica optic 128 was calibrated to the pickoff power meter 112 reading before each experiment. To calibrate the relationship between pickoff and actual power, an additional power meter 112a (shown in FIG. 12a) was placed downstream of the shutter optic 114 (relative to travel of the beam 102a' shown in FIG. 12a).

During testing an open-loop voltage was sent to the AOM 104 and the power was read from the power pickoff meter 112 and the additional power meter 112a. Data from both meters was collected for 5 seconds after the power reading was stabilized. The average and standard deviation of the power from 1000 samples was calculated. FIG. 13 shows the relationship between the AOM voltage, pickoff power, and system power collected for power calibration. The AOM 104 has a nonlinear relationship between voltage and power output, making the pickoff power meter 112 important for measurement rather than the un-deflected beam 102a1' described above. The pickoff power meter 112 has a linear relationship to power entering the system 100, as expected. The relationship between the system power and the pickoff power is expected to remain substantially constant with multiple experiments due to constant percentage of the full power being redirected toward the pickoff meter 112. During testing, power calibration was performed before each of experiment to remove any error in the pickoff power meter 112 from ambient temperature.

Closed Loop Power Control

It will be appreciated that the output of the laser 102 fluctuates with ambient temperature. For this reason, the system 100, in one preferred implementation, incorporates closed loop control to provide constant power and compensate for fluctuations. FIG. 12c shows a simplified diagram to illustrate the control loop used for closed loop power control with the system 100. During experiments, readings from the pickoff power meter 112 were obtained. The calibration described above was used to relate the pickoff power to the desired power going to the optic 128. The drive signal (e.g., voltage) going to the AOM 104 was then adjusted for any differences between the desired power and the power reading.

Beam Steering and Imaging

Referring to FIG. 12b, the beam 102a1' that passed through the shutter optic 114 described above is sent along the path shown in FIG. 12b to the chamber 126. The chamber 126 is optional and, if used, its internal environment may be heated to reduce the temperature differential between the beam 102a1' and the optic 128. Whether the chamber 126 is employed or not, the optic 128 is supported about only its periphery on a support surface 129. A co-linear imaging system consisting of the beam steering subsystem 124, the pickoff mirror lens 122, and plurality of lenses L5-L7 can be used to monitor the optical surface 128. An imaging device 130 may be included, which in this example is a charged coupled device (CCD), for recording a video of the optic 128 while it is being heated. The imaging system is included in this embodiment to calibrate and monitor the laser position on the fused silica sample before and during experiments, although the imaging system may not be absolutely necessary when using the system 100 in a real world application.

The heated chamber 126 in this example uses a top-down configuration, meaning, the beam needs to be aligned to enter through a top window of the heated chamber 126. For this, the beam 102a1' was directed through L4, a spherical lens with focal length 508 mm. The beam 102a1' then then is reflected by the mirror M8 to the pickoff mirror lens 122. The pickoff mirror lens 122 transmits 10.6 μm wavelength and reflects visible light used for the imaging device 130.

The beam 102a1' is then sent to the galvanometer 124 (e.g., available from NutField Technology (now Thorlabs, of Santa Barbara, CA) as model QS-30) which uses two mirrors 124a and 124b that rotate to scan the beam 102a1' on the sample plane. After being directed by the galvanometer 104, the beam 102a1' is sent to a meniscus lens (L5 in this example) with an effective focal length of 190 mm. The meniscus lens was used to flatten the focal plane as the beam is scanned by the galvanometer system. The combination focal lengths of L4 and L5 was chosen to create a slightly converging beam.

An imaging system comprised of the imaging device 130 was used to view the experiments in situ that were carried out using the system 100, and to ensure the sample surface (i.e., optic 128 upper surface) was in the correct plane before polishing. An illumination light (not shown) was placed to shine into one of the ports in the heated chamber 126. The illumination could not be co-linear with the beam 102a1' because the ZnSe lens L5 and chamber 126 window (not shown) have reflective surfaces in the visible spectrum that would reflect any incident light. Additionally, the ZnSe lenses have a different focal distance in the visible spectrum than at the $CO_2$ laser 102 wavelength. The meniscus lens L5 could not be placed at the focal distance of both wavelengths and distorted some of the visible light. Therefore, the light coming from the heated chamber 126 and going through L5 was reflected by the pickoff mirror 122 through lenses L6 and L7 to focus the image on the imaging device 130 camera as best as possible. Lens L6 in this example has a 200 mm focal length and is used as a field lens to garner more light from the system 100 due to decreased transmission through the ZnSe meniscus lens and chamber 126 window (not shown). Lens L7 in this example has a focal length of 100 mm and is used to focus the image on the imaging device 120.

FIG. 14 shows a high level flowchart 200 illustrating operations that may be performed using the system 100 of FIGS. 12a and 12b. At operation 202 the optic 128 may be supported about its periphery, for example by the support structure 129. At operation 204 a laser beam may be generated using the laser 102. At operation 206 the beam power of the laser beam may be adjusted, for example using the acousto-optic modulator 104. At operation 208, the beam may be steered as needed to trace a line on the optic 128 (or a plurality of line segments, or any other desired line or point segment(s)) to controllably deform the optic 128.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The various embodiments and methods described herein of the system 100 as described herein.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

13

What is claimed is:

1. An apparatus for modifying a curvature of a circularly shaped, flat plate having a flat surface, comprising:

an electronic controller;

a memory accessible by the electronic controller;

a laser configured to communicate with the electronic controller and to generate a beam having a predetermined energy and a beam annular radius $r_0$;

a software module for storing at least one of: an algorithm for beam control or power control over the laser;

an acousto-optic modulator for controlling an amount of beam diffraction imposed on the beam prior to passing the beam to the flat plate, wherein the flat plate has a radius r, a support structure for supporting the flat plate only about a plurality of spaced apart peripheral edges thereof to enable deformation of the flat plate along an axis normal to the flat surface of the flat plate;

the beam from the laser being directed at the flat surface of the flat plate;

the beam being controlled by the electronic controller to create a force distribution created by the beam, which creates a line load being applied to the flat plate, in addition to a width of the force distribution, a poisson's ratio of material making up the flat plate, a radius r of the flat plate, a thickness of the flat plate, and a beam annular radius $r_0$, and the beam further being controlled by the electronic controller in accordance with a selected one of the algorithm for beam control or by the power control over the laser; and the beam being controlled by the controller to trace a select path on the one surface of the flat plate, to heat and densify portions of the flat plate to create a force on the flat plate, the force acting in the axis normal to the flat plate causing a stress which induces a controlled degree of deformation of the flat plate at an axial center of the plate and along the axis normal to the plate, to modify a curvature of the plate in a manner to produce a continuous, uniform spherical curvature over a full area of the flat plate, and the deformation being maximized at an axial center of the flat plate and controlled by the predetermined energy of the beam at select locations on the flat plate.

2. The apparatus of claim 1, further comprising a beam steering system configured to move the beam in a desired path to trace at least one line segment on the one surface of the flat plate.

3. The apparatus of claim 2, wherein the at least one line segment comprises a non-straight path, and the line load created comprises a line force.

4. The apparatus of claim 2, wherein the desired path comprises a circular path, and the line load created comprises a line force.

5. The apparatus of claim 2, wherein the desired path comprises a complete circular path, and the line load created comprises a line force.

6. The apparatus of claim 2, wherein the at least one line segment comprises a plurality of non-straight line segments.

7. The apparatus of claim 2, wherein the beam steering system comprises a galvanometer.

8. The apparatus of claim 7, further comprising:

a pickoff mirror configured to receive an image of the flat plate after the beam has passed back through the galvanometer, and to route the image to an imaging subsystem; and an imaging system having a charge coupled display (CCD) for receiving a visible portion of the beam returned back from the galvanometer.

9. The apparatus of claim 1, wherein the laser comprises a $CO_2$ laser.

10. The apparatus of claim 1, further comprising a beam dump for receiving a portion of the beam from the acousto-optic modulator.

11. The apparatus of claim 1, further comprising:

a wedged optic responsive to the beam for passing only a predetermined portion of the beam generated by the laser;

a pickoff power meter configured to receive the passed predetermined portion of the beam from the wedged optic, the passed predetermined portion of the beam being used by the pickoff power meter for measuring a power of the beam; and the electronic controller in communication with the pickoff power meter for assisting in controlling a power level of the beam.

12. The apparatus of claim 1, wherein the support structure includes a heated chamber.

* * * * *